J. GAITS.
TROLLEY POLE.
APPLICATION FILED MAY 28, 1910.
1,020,411.
Patented Mar. 19, 1912.
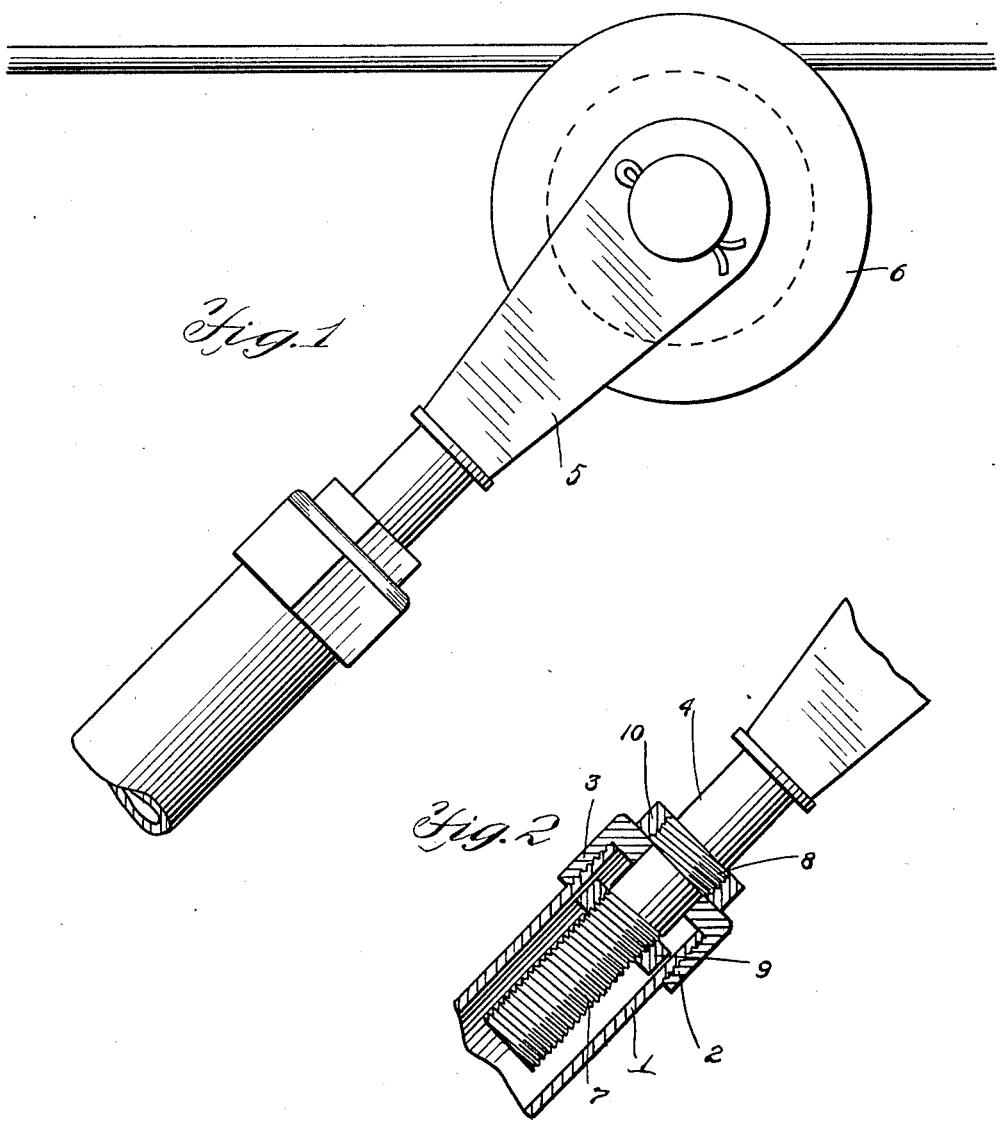
Witnesses
N. Abramson
L. M. Gillespie
Inventor
Joseph Gaits
By Alex. J. Wedderburn, Jr.
Attorney

UNITED STATES PATENT OFFICE.

JOSEPH GAITS, OF JEANNETTE, PENNSYLVANIA.

TROLLEY-POLE.

1,020,411. Specification of Letters Patent. Patented Mar. 19, 1912.

Application filed May 28, 1910. Serial No. 563,953.

*To all whom it may concern:*

Be it known that I, JOSEPH GAITS, citizen of the United States, residing at Jeannette, in the county of Westmoreland and State of Pennsylvania, have invented certain new and useful Improvements in Trolley-Poles, of which the following is a specification.

This invention relates to improvements in trolley poles and the object of the invention is the construction of a trolley pole having a wheel holding head swiveled thereto by a simple nut arrangement, whereby the wheel of the trolley pole will readily adjust itself to any curve without jumping off the track.

With the above and other objects in view the invention comprises certain combinations, constructions and arrangements of parts, clearly described in the following specification and clearly illustrated in the accompanying drawings, which with the numerals of reference marked thereon form a part of this specification and in which, Figure 1 is a side elevation of a trolley pole having the improvements, and Fig. 2 is a sectional view of the swivel joint.

Referring to the accompanying drawings illustrating the invention 1 denotes the trolley pole, which is provided with the screw threads 2, which threads are engaged by the cap sleeve 3, which cap is formed with internal screw threads. The cap or nut 3 is provided with a centrally located opening through which the trolley holding stem or rod 4 is adapted to vertically move. This stem or rod 4 is provided with trolley holding bearings or plates 5, between which the trolley wheel 6 is pivotally mounted.

The rod or stem 4 is provided with screw threads 7 on its end, which are received within the tubular pole 1, and also with screw threads 8. On the screw threads 7 a nut 9 is threaded, which nut is adapted to engage the inner side of the cap or nut 3, and on the screw threads 8 a nut 10 is threaded, which is adapted to engage the outerside of the nut or cap 3. The nuts 9 and 10 are spaced apart from each other a sufficient distance to allow for a slight movement of the stem along the trolley and the portion of the stem or rod 4 which engages the edge of the opening in the nut or cap 3 is formed smooth so as to allow said stem or rod to rotate on the cap or nut 3 and on the trolley pole, when the car to which it is attached is rounding a curve.

The nut 9 is slightly smaller in circumference than the bore in the trolley pole thus permitting a slightly lateral movement of the trolley head.

Having described my invention, I claim:—

In combination with a tubular trolley pole a trolley head having a rod depending therefrom, said rod being screw threaded, a cap on said trolley pole, an opening in said cap, nuts on said head on each side of said cap, and a trolley wheel mounted on said head.

In testimony whereof I affix my signature in presence of two witnesses.

JOSEPH GAITS.

Witnesses:
E. C. CURRY,
JAMES GAITS.

---

Copies of this patent may be obtained for five cents each, by addressing the "Commissioner of Patents, Washington, D. C."